(12) United States Patent
He et al.

(10) Patent No.: US 11,005,700 B2
(45) Date of Patent: May 11, 2021

(54) SYSTEM AND METHOD FOR QUICKLY DETERMINING REASONABLE ALARM THRESHOLD OF NETWORK

(71) Applicant: SHANGHAI NETIS TECHNOLOGIES CO., LTD., Shanghai (CN)

(72) Inventors: Xiaolin He, Shanghai (CN); Tao Wang, Shanghai (CN); Yuliang Zhou, Shanghai (CN)

(73) Assignee: SHANGHAI NETIS TECHNOLOGIES CO., LTD., Shanghai (CN)

( * ) Notice: Subject to any disclaimer, the term of this patent is extended or adjusted under 35 U.S.C. 154(b) by 96 days.

(21) Appl. No.: 15/753,970

(22) PCT Filed: May 5, 2016

(86) PCT No.: PCT/CN2016/081056
§ 371 (c)(1),
(2) Date: Feb. 20, 2018

(87) PCT Pub. No.: WO2017/032043
PCT Pub. Date: Mar. 2, 2017

(65) Prior Publication Data
US 2018/0241611 A1 Aug. 23, 2018

(30) Foreign Application Priority Data
Aug. 24, 2015 (CN) .......................... 201510524396.4

(51) Int. Cl.
*G06F 15/173* (2006.01)
*H04L 12/24* (2006.01)

(52) U.S. Cl.
CPC .......... *H04L 41/06* (2013.01); *H04L 41/0681* (2013.01); *H04L 41/145* (2013.01); *H04L 41/22* (2013.01)

(58) Field of Classification Search
CPC ..... G16H 40/63; H04L 41/5009; H04L 43/08; H04L 41/06; A61B 2560/0223; A61B 2560/0252
See application file for complete search history.

(56) References Cited

U.S. PATENT DOCUMENTS 7,472,182 B1 * 12/2008 Young ................. H04L 67/1097
702/186
8,086,708 B2 * 12/2011 Breitgand ............... H04L 41/00
709/223

(Continued)

*Primary Examiner* — Brian Whipple
*Assistant Examiner* — Gregory P Tolchinsky

(57) ABSTRACT

The present invention provides a system and method for quickly determining a reasonable alarm threshold of a network, including: a presentation component for setting the template type and template parameter of an alarm simulation template, a generator for generating an alarm simulation task according to the alarm simulation template, a task component for executing the alarm simulation task to generate a data result set, and a storage component for storing and providing the data result set for the presentation component. The present invention adopts the asynchronous calculation, and adopts fragment manner during data statistics; the time period is divided into time slices and processed in parallel, and then aggregated, to improve the data processing rate; the similar alarm points are merged, thereby accurately obtaining the actual number of alarms and presenting in an incremental mode.

10 Claims, 2 Drawing Sheets

(56) References Cited

U.S. PATENT DOCUMENTS

| | | | | |
|---|---|---|---|---|
| 2002/0184043 | A1* | 12/2002 | Lavorgna, Jr. | G06F 16/972 715/234 |
| 2006/0227714 | A1* | 10/2006 | Griffin | H04L 43/50 370/241 |
| 2008/0255438 | A1* | 10/2008 | Saidara | A61B 5/14532 600/365 |
| 2009/0034411 | A1* | 2/2009 | Bernard | H04L 41/06 370/221 |
| 2009/0278680 | A1* | 11/2009 | Hollender | G05B 23/0216 340/514 |
| 2010/0135226 | A1* | 6/2010 | Chandramouli | H04W 36/02 370/329 |
| 2010/0211949 | A1* | 8/2010 | Nakajima | H04L 67/1097 718/100 |
| 2012/0271748 | A1* | 10/2012 | DiSalvo | G06Q 40/04 705/37 |
| 2015/0382208 | A1* | 12/2015 | Elliott | G06F 16/245 370/252 |
| 2016/0131764 | A1* | 5/2016 | Chan | B64G 1/242 342/357.42 |
| 2016/0277249 | A1* | 9/2016 | Singh | H04L 67/1097 |
| 2016/0301579 | A1* | 10/2016 | Djukic | H04L 41/5009 |
| 2017/0061089 | A1* | 3/2017 | De Waele | G16H 50/30 |
| 2017/0353831 | A1* | 12/2017 | Colonna | H04W 4/029 |

* cited by examiner

SYSTEM AND METHOD FOR QUICKLY DETERMINING REASONABLE ALARM THRESHOLD OF NETWORK

CROSS REFERENCE OF RELATED APPLICATION

This is a U.S. National Stage under 35 U.S.C 371 of the International Application PCT/CN2016/081056, filed May 5, 2016, which claims priority under 35 U.S.C. 119(a-d) to CN 201510524396.4, filed Aug. 24, 2015.

BACKGROUND OF THE PRESENT INVENTION

Field of Invention

The present invention belongs to the field of network monitoring, and more particularly, to a system and method for quickly determining a reasonable alarm threshold of a network.

Description of Related Arts

With the development of social science and technology, the network has become an indispensable part of the enterprise, and especially the financial enterprise. Nowadays, the business volume of enterprises is increasing exponentially, and the scale of enterprise networks has experienced an explosive expansion. The enterprise network has some characteristics that the network topology is complex; the network devices are widely distributed; there are a variety of business types. Some enterprises such as banks, securities companies and exchanges have stringent requirements for the data transmission response time and information accuracy and confidentiality.

When a fault occurs in the real network, the network management system needs to quickly and accurately show the alarm situation, which is used by O&M (operation and maintenance) personnel to perform fault location and take measures to restore the network; therefore, the alarm management in the network management has become one of the most important basic functions. However, in actual operation, how to determine the alarm threshold in the network management system has become the most troublesome problem for network managers. The main reason is that the data flow passing through each network node in the network topology is different, and there are some disparities. Therefore, a unified standard cannot be used to judge whether the flow on all network devices is abnormal or not.

Now, the method for generally determining an alarm threshold of each node comprises steps of: after the observation of network managers in the actual business for a period of time (to obtain reliable and accurate data as much as possible, the time will be longer), counting data information list and making a chart, obtaining an initial value after complex comparison and statistics, and finally judging whether the alarm threshold of the node is reasonable according to the personal O&M experience in the network or business.

The above method not only wastes a lot of manpower and time, but also requires the actual operator to have strong ability and experience in operation and maintenance.

SUMMARY OF THE PRESENT INVENTION

In view of the defects in the prior art, an object of the present invention is to provide a system and method for quickly determining a reasonable alarm threshold of a network. The technical problems of the present invention to be solved are embodied in the following points:

1) How to carry out the alarm simulation according to the different characteristics of the business;
2) How to speed up the alarm simulation process;
3) How to provide visual, real-time and convenient statistical data for the alarm threshold range reasonably determined by the user and the accurately calculated number of alarms.

A system for quickly determining a reasonable alarm threshold of a network, provided by the present invention, comprises:

a Web presentation component for setting a template type and template parameter of an alarm simulation template;
a generator for generating an alarm simulation task according to the alarm simulation template;
a task component for executing the alarm simulation task to generate a data result set; and
a storage component for storing and providing the data result set for the presentation component.

Preferably, the template type is at least one member selected from a group consisting of:
network bit rate;
network byte rate;
network flow;
bandwidth utilization rate;
number of packets;
packet rate;
average packet length;
packet length distribution;
TCP session;
number of concurrent connections;
number of zero windows;
number of concurrent clients;
number of packet relays;
link setup success rate;
number of lost packets;
packet retransmission rate;
number of TCP SYN packets;
number of TCP FIN packets;
number of TCP RST packets;
number of TCP retransmission packets;
number of TCP zero window packets;
TCP server response time,
TCP client waiting time;
TCP server data transfer time;
TCP client data transfer time;
TCP-to-client network latency;
TCP-to-server network latency;
timeout for TCP long-time connection;
transaction volume;
transaction response rate;
transaction success rate; and
transaction response time;
the template parameter is at least one member selected from a group consisting of:
historical data source;
alarm type;
trigger condition;
duration;
schedule;
alarm simulation time range; and
time granularity.
Preferably, the task component comprises:

a first processor for acquiring history data information of a first time period from the storage component according to the template type corresponding to the alarm simulation task;

a second processor for dividing the history data information of the first time period into history data information of a plurality of second time periods according to time, wherein the second time period is a sub-period of the first time period;

a third processor for performing parallel statistics on the history data information of the plurality of second time periods, to obtain a plurality of sub-statistical results;

a fourth processor for aggregating the plurality of sub-statistical results into an aggregate statistical result according to time; and a fifth processor for comparing the aggregate statistical result with a threshold interval to obtain the number of alarms.

Preferably, the fifth processor comprises:

a sixth processor for collecting a plurality of data points from the aggregate statistical result according to the time granularity parameter in the template parameter;

a seventh processor for performing curve fitting of the data points to obtain a data curve; and an eighth processor for counting a time T corresponding to each line segment with data curve exceeding the threshold range, and regarding the number of continuous line segments with corresponding time T that is greater than the duration parameter in the template parameter as the number of alarms.

Preferably, the seventh processor obtains the data curve in real time according to the data points acquired by the sixth processor;

the eighth processor obtains the number of alarms in real time according to the data curve that has been fitted by the seventh processor.

Preferably, the data curve passes through each data point fitted.

Preferably, the presentation component is further adapted for:

distributing an alarm simulation template to the generator and presenting an alarm simulation task request; and asynchronously polling an alarm simulation task status of the generator; if the alarm simulation task status is COMPLETED, retrieving the corresponding data result set in the storage component by a generator number.

Preferably, the step of the presentation component presenting the alarm simulation task request, comprises:

Step A1: generating corresponding data form according to the template type and template parameter set by a user through a page;

Step A2: matching with a corresponding data source port according to the data form;

Step A3: if the match is successful, distributing the data form to a cache area of the generator; if the match fails, returning failure information to the presentation component; and Step A4: generating a number of workgroups according to a matching result, and retrieving the data form in the cache area, wherein when there are a plurality of workgroups, concurrently processing tasks through the plurality of workgroups;

the step of the presentation component asynchronously polling the alarm simulation task status of the generator comprises:

Step B1: continuously generating a status query request task of the generator by the presentation component according to a preset time interval;

Step B2: if multiple generators work at the same time, selecting a most appropriate generator according to a load balancing algorithm; and Step B3: distinguishing each status query request task of the generator according to the workgroup number as a mark, distributing the workgroup number information to a selected generator; wherein the generator maintains a same polling frequency as the presentation component, and returns the simulated alarm task status to the presentation component; wherein the simulated alarm task status comprises task accepted but not processed, task being processed and task completed.

Preferably, the generator is further adapted for:

generating the corresponding task type according to the alarm simulation task request of the presentation component, and transmitting to the task component;

continuously reading the data result set in the storage component and determining the simulated alarm task status; and returning the simulated alarm task status to the presentation component;

wherein, the step of the generator generating the corresponding task type comprises:

Step C1: receiving the corresponding data form according to the task type of the alarm simulation task request generated by the presentation component;

Step C2: generating the corresponding task information according to the content of the data form; and Step C3: submitting the task information and generating a preprocessing task into a task queue, for the task component to schedule preprocessing tasks in the task queue;

wherein, the step of the generator reading the data result set in the storage component comprises:

Step D1: matching the corresponding data result set in a database according to the workgroup number and querying a result; and Step D2: storing an immediate data result set status in the cache area by the storage component; reading the cache area and presenting a result status by the generator.

Preferably, the task component is further adapted for:

generating task threads according to scheduled preprocessing tasks;

parallel generating the data result set in real time in a multitasking thread manner; wherein the task thread matches a database table according to the different template types; and transmitting the data result set to the storage component.

The storage component is further adapted for:

setting up three levels of tables according to different business requirements: port table, site table and application table;

data written to the storage component has a percentage attribute and is bound to the simulated alarm task status of the generator; and responding the written data result to the generator in real time.

Preferably, the presentation component comprises at least one member selected from a group consisting of a Web component, a GUI component and a terminal.

Preferably, the storage component comprises a database component and/or a file system.

A method for quickly determining a reasonable alarm threshold of a network is implemented by the above-mentioned system for quickly determining the reasonable alarm threshold of the network.

Preferably, the method comprises steps of:

Step 1: setting a template type and template parameter of an alarm simulation template;

Step 2: generating an alarm simulation task according to the alarm simulation template;

Step 3: executing an alarm simulation task and generating a data result set; and Step 4: storing and providing the data result set for the presentation component.

Preferably, the template type is at least one member selected from a group consisting of:
- network bit rate;
- network byte rate;
- network flow;
- bandwidth utilization rate;
- number of packets;
- packet rate;
- average packet length;
- packet length distribution;
- TCP session;
- number of concurrent connections;
- number of zero windows;
- number of concurrent clients;
- number of packet relays;
- link setup success rate;
- number of lost packets;
- packet retransmission rate;
- number of TCP SYN packets;
- number of TCP FIN packets;
- number of TCP RST packets;
- number of TCP retransmission packets;
- number of TCP zero window packets;
- TCP server response time;
- TCP client waiting time;
- TCP server data transfer time;
- TCP client data transfer time;
- TCP-to-client network latency;
- TCP-to-server network latency;
- timeout for TCP long-time connection;
- transaction volume;
- transaction response rate;
- transaction success rate; and
- transaction response time;

the template parameter is at least one member selected from a group consisting of:
- historical data source;
- alarm type;
- trigger condition;
- duration;
- schedule;
- alarm simulation time range; and
- time granularity.

Preferably, the step (3) comprises:

Step 3.1: acquiring history data information of a first time period from the storage component according to the template type corresponding to the alarm simulation task;

Step 3.2: dividing the history data information of the first time period into history data information of a plurality of second time periods according to time, wherein the second time period is a sub-period of the first time period;

Step 3.3: performing parallel statistics on the historical data information of the plurality of second time periods, to obtain a plurality of sub-statistical results;

Step 3.4: aggregating the plurality of sub-statistical results into an aggregate statistical result according to time; and Step 3.5: comparing the aggregate statistical result with the threshold interval to obtain the number of alarms.

Preferably, the step (3.5) comprises:

Step 3.5.1: collecting a plurality of data points from the aggregate statistical result according to the time granularity parameter in the template parameter;

Step 3.5.2: performing curve fitting of the data points to obtain a data curve; and Step 3.5.3: counting a time T corresponding to each line segment with data curve exceeding the threshold range, and regarding the number of continuous line segments with corresponding time T that is greater than the duration parameter in the template parameter as the number of alarms.

Preferably, the data curve is obtained in real time according to the data points acquired;

the number of alarms is obtained in real time according to the data curve that has been fitted.

Preferably, the data curve passes through each data point fitted.

Preferably, the step (1) comprises:
- distributing an alarm simulation template to the generator and presenting an alarm simulation task request; and
- asynchronously polling an alarm simulation task status of the generator; if the alarm simulation task status is COMPLETED, retrieving the corresponding data result set in the storage component by a generator number.

Preferably, the step of presenting the alarm simulation task request comprises:

Step A1: generating corresponding data form according to the template type and template parameter set by a user through a page;

Step A2: matching with a corresponding data source port according to the data form;

Step A3: if the match is successful, distributing the data form to a cache area of the generator: if the match fails, returning failure information to the presentation component; and Step A4: generating a number of workgroups according to a matching result, and retrieving the data form in the cache area, wherein when there are a plurality of workgroups, concurrently processing tasks through the plurality of workgroups;

the step of the presentation component asynchronously polling the alarm simulation task status of the generator comprises:

Step B1: continuously generating a status query request task of the generator by the presentation component according to a preset time interval;

Step B2: if multiple generators work at the same time, selecting a most appropriate generator according to a load balancing algorithm; and Step B3: distinguishing each status query request task of the generator according to the workgroup number as a mark, distributing the workgroup number information to a selected generator; wherein the generator maintains a same polling frequency as the presentation component, and returns the simulated alarm task status to the presentation component; wherein the simulated alarm task status comprises task accepted but not processed, task being processed and task completed.

Preferably, the step (2) comprises:
- generating the corresponding task type according to the alarm simulation task request of the presentation component, and transmitting to the task component;

continuously reading the data result set in the storage component and determining the simulated alarm task status; and returning the simulated alarm task status to the presentation component;

wherein, the step of the generator generating the corresponding task type comprises:

Step C1: receiving the corresponding data form according to the task type of the alarm simulation task request generated by the presentation component;

Step C2: generating the corresponding task information according to the content of the data form; and Step C3: submitting the task information and generating a preprocessing task into a task queue, for the task component to schedule preprocessing tasks in the task queue;

wherein, the step of the generator reading the data result set in the storage component comprises:

Step D1: matching the corresponding data result set in a database according to the workgroup number and querying a result; and Step D2: storing an immediate data result set status in the cache area by the storage component; reading the cache area and presenting a result status by the generator.

Preferably, the step (3) further comprises steps of:

generating task threads according to scheduled preprocessing tasks;

parallel generating the data result set in real time in a multitasking thread manner; wherein the task thread matches a database table according to the different template types; and transmitting the data result set to the storage component; the step (4) comprises:

setting up three levels of tables according to different business requirements: port table, site table and application table;

data written to the storage component has a percentage attribute and is bound to the simulated alarm task status of the generator; and responding the written data result to the generator in real time.

Preferably, the presentation component comprises at least one member selected from a group consisting of a Web component, a GUI component and a terminal.

Preferably, the storage component comprises a database component and/or a file system.

Compared with the prior art, the present invention has following beneficial effects:

1. The present invention adopts the asynchronous calculation, to improve the efficiency of the alarm simulation;

2. The present invention adopts fragment manner during data statistics; the historical data information in the first time period is divided into historical data information of a plurality of second time periods according to the time, and processed in parallel, and then aggregated, to improve the data processing rate;

3. The present invention merges the similar alarm points, to accurately obtain the actual number of alarms;

4. The present invention adopts incremental presentation; data points, data curves and the number of alarms are generated in real-time increment manner, and counted for presentation.

BRIEF DESCRIPTION OF THE DRAWINGS

Other features, objects, and advantages of the present invention will become more apparent from reading the description of non-limiting embodiments detailed with reference to the following drawings.

DETAILED DESCRIPTION OF THE PREFERRED EMBODIMENT

The present invention is described in detail as follows with reference to specific embodiments. The following embodiments will help provide further understanding of the present invention for those skilled in the art, and not in any way limit the present invention. It should be noted that any changes and improvements can be made without departing from concept of the present invention for ordinary persons skilled in the art. All these fall within the protection scope of the present invention.

Figure 1:
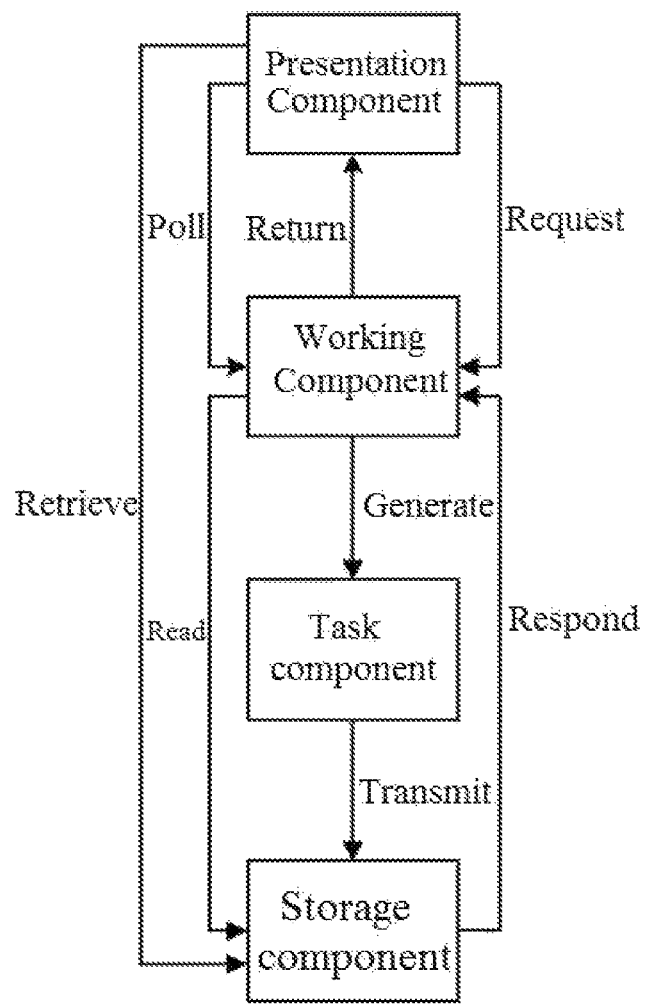
FIG. 1 is a block diagram of a system for quickly determining a reasonable alarm threshold of a network according to the present invention.

As shown in FIG. 1, a system for quickly determining a reasonable alarm threshold of a network according to the present invention comprises:

a presentation component for setting a template type and template parameter of an alarm simulation template;

a generator for generating an alarm simulation task according to the alarm simulation template;

a task component for executing the alarm simulation task to generate a data result set, and a storage component for storing and providing the data result set for the presentation component.

Preferably, the presentation component can be a Web service component or a GUI component.

Next, each component will be described in detail.

I. Presentation Component which is Adapted for:

1) setting the template type and the template parameter of the alarm simulation template, wherein: the template type can be divided into network bit rate, bandwidth utilization rate, packet rate, packet retransmission rate and etc., the parameters that can be set by different template types are historical data source, alarm type, trigger condition, duration, schedule, alarm simulation time range, time granularity, etc.;

2) distributing an alarm simulation template to the generator and presenting an alarm simulation task request;

3) asynchronously polling an execution status of alarm simulation task of the generator; and 4) if the execution status of alarm simulation task is COMPLETED, retrieving the corresponding data result set in the storage component by a generator number.

Further, the step of the presentation component presenting the alarm simulation task request comprises:

Step A1: generating corresponding data form according to the template type and template parameter set by a user through a page, and presenting request-receiving information;

Step A2: matching with a corresponding data source port according to the data form;

Step A3: if the match is successful, distributing the data form to a cache area of the generator; if the match fails, returning failure information to the presentation component; and Step A4: generating workgroups according to a matching result and retrieving the data form in the cache area, proceeding to the next step, wherein concurrently processing tasks of a plurality of workgroups can be generated according to different alarm simulation tasks.

The step of the presentation component asynchronously polling the execution status of alarm simulation task of the generator comprises:

Step B1: continuously generating a status query request task of the generator by the presentation component according to a preset time interval;

Step B2: if multiple generators work in the system at the same time, selecting a most appropriate generator according to a load balancing algorithm;

Step B3: distinguishing each status query request task according to the workgroup number as a mark, distributing the workgroup number information to a selected generator; and Step B4: maintaining a same polling frequency between the generator and the presentation component, and returning the simulated alarm task status to the presentation component; wherein the simulated alarm task status comprises task accepted but not processed, task being processed and task completed.

II. Generator is Adapted for:

1) generating the corresponding task type according to the alarm simulation task request of the presentation component, and transmitting to the task component;

2) generating a simulated alarm task status;

3) continuously reading the data result set in the storage component and determining the simulated alarm task status; and 4) returning the simulated alarm task status to the presentation component.

Further, the step of the generator generating the corresponding task type comprises:

Step C1: receiving the corresponding data form according to the task type of the alarm simulation generated by the presentation component;

Step C2: generating the corresponding task information according to the content of the data form; and Step C3: submitting the task information and generating a preprocessing task into a task queue, for the task component to schedule preprocessing tasks in the task queue.

The step of the generator reading the data result set in the storage component comprises:

Step D1: matching the corresponding data result set in a database according to the workgroup number and querying a result; calculating an immediate data processing result by the storage component, and writing in the data result set; and Step D2: storing the immediate data result set status in the cache area by the storage component; reading the cache area and presenting a result status by the generator.

III. Task Component is Adapted for:

1) generating task threads according to scheduled preprocessing tasks;

2) generating the data result set in real time through an alarm simulation task processing method; and 3) transmitting the data result set to the storage component.

Figure 2:
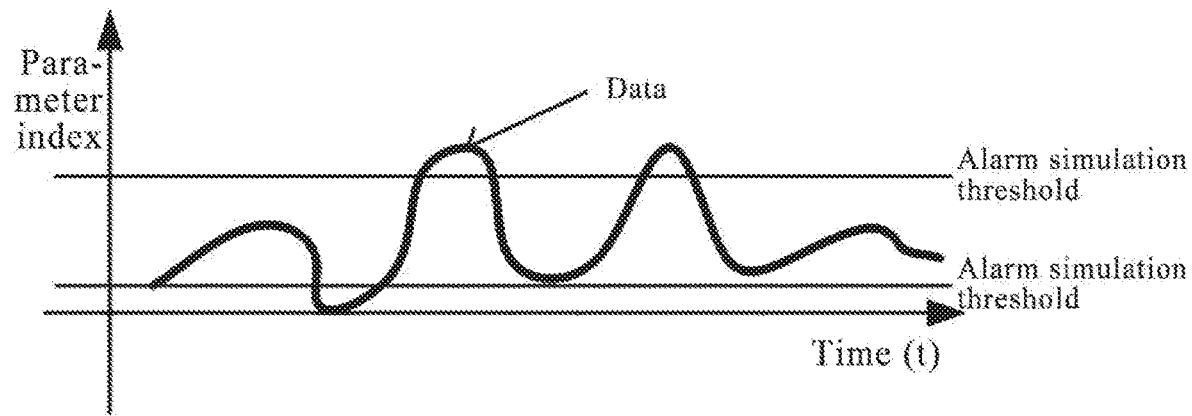
FIG. 2 is a comparison chart of alarm simulation thresholds.
Figure 3:
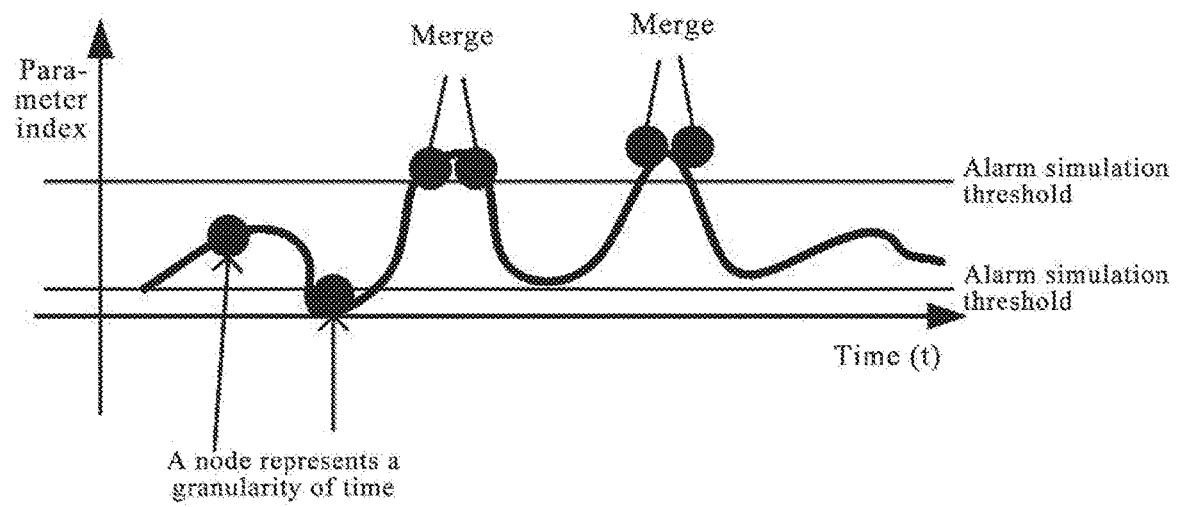
FIG. 3 is a merger diagram of similar alarm simulation points.

Further, the alarm simulation task processing method comprises steps of:

Step E1: matching a database table by a task thread according to the different template types;

Step E2: corresponding the historical data information of the alarm simulation to the time period N, dividing the time period N into M time slices by the task thread and generating M threads to match the data simultaneously, performing parallel statistics, and aggregating the statistical results corresponding to the M time slices into a statistical result;

Step E3: calculating the aggregated statistical results according to the different template types, as shown in FIG. 2, wherein data points are determined according to the template parameter time granularity, the data curve is generated; if the data points exceed the threshold range of the alarm simulation, they are judged to be the alarm point; the date curve is obtained by fitting according to the data point curve; preferably, the data curve passes through each data point; in the threshold comparison chart, the data curve is compared with the threshold range; and Step E4: counting a time T corresponding to each line segment with data curve exceeding the threshold range; regarding the number of continuous line segments with corresponding time T that is greater than the duration parameter in the template parameter as the number of alarms, wherein the time T corresponding to a continuous line segment may be the duration of the continuous line segment exceeding the threshold range, or an integral multiple of the time granularity of the continuous line segment exceeding the threshold range.

Further, by comparing the time T corresponding to the continuous line segment with the duration parameter in the template parameter, the false alarm that the corresponding time T is less than or equal to continuous application parameter can be screened.

IV. Storage Component is Adapted for:

1) setting up three levels of tables according to different business requirements: port table, site table and application table;

2) data written to the storage component has a percentage attribute and is bound to the simulated alarm task status of the generator; data with the percentage attribute means that only a part of the data can be returned according to the retrieval instruction, with no need to return the entire data; and 3) responding the written data result to the generator in real time, wherein the system can rapidly roll back the historical data, select the template set limit parameters, and present the simulation alarm results on the page for reference by the O&M personnel.

Depending on the results of the rollback in different time ranges, a reasonable alarm threshold can be easily obtained.

Corresponding to the above-mentioned system for quickly determining reasonable alarm threshold of network, the invention further provides a method for quickly determining reasonable alarm threshold of network. In a preferred embodiment, the method according to the operation steps of the system and its components comprises steps of:

Step i1: selecting a network bit rate template (wherein template types comprise network bit rate, bandwidth utilization rate, packet rate and packet retransmission rate);

Step i2: setting template parameters, which comprises:

(1) historical data sources (comprising optional view class and link class);

(2) alarm type (which is optional threshold or baseline);

(3) trigger condition, wherein a bit rate is higher than x value for y minutes;

(4) schedule which can be set by days, for example: 7 days, one day of the week (Monday to Sunday), a few days of the week (such as Monday and Wednesday);

(5) time granularity which is z minutes; and (6) alarm simulation time range; (i.e., rollback time range) which is from Time a to Time b (accurate to second);

Step i3: starting an alarm simulation and quickly obtaining a statistical result value, namely, the number of alarms:

Step i4: selecting a different alarm simulation time range, and obtaining multiple statistical results according to the steps (i1-i3); and Step i5: according to a specific flow situation of each network node, reasonably judging the alarm threshold by combining the statistical results with network quality requirements.

It will be appreciated by those skilled in the art that, in addition to implementing the system and various devices provided by the present invention by purely computer-readable program code mode, the system and various devices provided by the present invention can achieve the same function in the form of logic gates, switches, special integrated circuit, programmable logic controller and microcontrollers by logically programming the method steps. Therefore, the system and various devices provided by the present invention may be considered as a kind of hardware component; the device for implementing various functions included therein may also be considered as a structure within a hardware component; the device for implementing various functions may be considered as a software module for implementing the method and a structure within the hardware component.

Specific embodiments of the present invention are described above. It shall be understood that the present invention is not limited to the above-mentioned specific embodiments, and those skilled in the art can make various changes and modifications within the scope of the claims, and it shall not affect the substance of the present invention.

What is claimed is:

1. A system for determining an alarm threshold of a network, comprising:
a presentation component which comprises at least one member selected from a group consisting of a Web component, a GUI component and a terminal, and is adapted for setting template types and template parameters of an alarm simulation template, distributing the alarm simulation template and presenting an alarm simulation task request to a server, asynchronously polling an execution status of alarm simulation task of the server, and retrieving a corresponding data result set in a storage component by a server number if the execution status of alarm simulation task is COMPLETED;
the server for generating a corresponding task type according to the alarm simulation task request of the presentation component and transmitting to a task component, generating a simulated alarm task status, continuously reading the data result set in the storage component and determining the simulated alarm task status, and returning the simulated alarm task status to the presentation component;
the task component which comprises a processor for generating task threads according to scheduled preprocessing tasks, generating the data result set in real time through an alarm simulation task processing method, and transmitting the data result set to a storage component;
the storage component which comprises at least one of a database component and a file system, and is adapted for setting up three levels of tables according to different business requirements which are port table, site table and application table; binding data which are written to the storage component and has a percentage attribute with the simulated alarm task status of the server, wherein the data with the percentage attribute means that only a part of the data are returned according to a retrieval instruction, with no need to return the entire data; and responding written data results to the server in real time, so that the alarm threshold is obtained depending on the written data results in different time ranges, wherein:
the presentation component presenting an alarm simulation task request to the server comprises:
Step A1: generating a corresponding data form according to the template type and template parameter set by a user through a page;
Step A2: matching with a corresponding data source port according to the data form;
Step A3: if the match is successful, distributing the data form to a cache area of the server; if the match fails, returning failure information to the presentation component; and
Step A4: generating a number of workgroups according to a matching result, and retrieving the data form in the cache area, wherein when there are a plurality of workgroups, concurrently processing tasks of the plurality of workgroups,
the presentation component asynchronously polling the alarm simulation task status of the server comprises:
Step B1: continuously generating a status query request task of the server by the presentation component according to a preset time interval;
Step B2: if multiple servers work at the same time, selecting a server according to a load balancing algorithm; and
Step B3: distinguishing each status query request task of the server according to the workgroup number as a mark, distributing the workgroup number information to a selected server; wherein the selected server maintains a same polling frequency as the presentation component, and returns the simulated alarm task status to the presentation component; wherein the simulated alarm task status comprises task accepted but not processed, task being processed and task completed.

2. The system, as recited in claim 1, wherein:
the server generating the corresponding task type comprises:
Step C1: receiving the corresponding data form according to the task type of the alarm simulation task request generated by the presentation component;
Step C2: generating a corresponding task information according to a content of the data form; and
Step C3: submitting the task information and generating a preprocessing task into a task queue, for the task component to schedule preprocessing tasks in the task queue,
the server reading the data result set in the storage component comprises:
Step D1: matching the corresponding data result set in a database according to the workgroup number and querying a result; and
Step D2: storing an immediate data result set status in the cache area by the storage component; reading the cache area and presenting a result status by the server.

3. The system, as recited in claim 2, wherein:
the alarm simulation task processing method comprises steps of:
Step E1: matching a database table by a task thread according to the different template types;
Step E2: corresponding the historical data information of the alarm simulation to the time period N, dividing the time period N into M time slices by the task thread and generating M threads to match the data simultaneously, performing parallel statistics, and aggregating the statistical results corresponding to the M time slices into a statistical result;

Step E3: calculating the aggregated statistical results according to the different template types, wherein data points are determined according to the template parameter time granularity, the data curve is generated; if the data points exceed the threshold range of the alarm simulation, they are judged to be the alarm point; the date curve is obtained by fitting according to the data point curve; in the threshold comparison chart, the data curve is compared with the threshold range; and Step E4: counting a time T corresponding to each line segment with data curve exceeding the threshold range; regarding an amount of continuous line segments with corresponding time T that is greater than the duration parameter in the template parameter as an amount of alarms, wherein the time T corresponding to a continuous line segment may be the duration of the continuous line segment exceeding the threshold range, or an integral multiple of the time granularity of the continuous line segment exceeding the threshold range, by comparing the time T corresponding to the continuous line segment with the duration parameter in the template parameter, the false alarm that the corresponding time T is less than or equal to continuous application parameter is screened.

4. The system, as recited in claim 3, wherein the template type is at least one member selected from a group consisting of:
network bit rate;
network byte rate;
network flow;
bandwidth utilization rate;
number of packets;
packet rate;
average packet length;
packet length distribution;
TCP session;
number of concurrent connections;
number of zero windows;
number of concurrent clients;
number of packet relays;
link setup success rate;
number of lost packets;
packet retransmission rate;
number of TCP SYN packets;
number of TCP FIN packets;
number of TCP RST packets;
number of TCP retransmission packets;
number of TCP zero window packets;
TCP server response time;
TCP client waiting time;
TCP server data transfer time;
TCP client data transfer time;
TCP-to-client network latency;
TCP-to-server network latency;
timeout for TCP long-time connection;
transaction volume;
transaction response rate;
transaction success rate; and
transaction response time;
the template parameter is at least one member selected from a group consisting of:
historical data source;
alarm type;
trigger condition;
duration;
schedule;
alarm simulation time range; and
time granularity.

5. A method for determining an alarm threshold of a network, which comprises steps of:
(Step 1) setting template types and template parameters of an alarm simulation template, which comprises:
(Step 11) distributing the alarm simulation template to a server and presenting an alarm simulation task request to the server through a presentation component; and
(Step 12) asynchronously polling an alarm simulation task status of the server through the presentation component, wherein if the alarm simulation task status is COMPLETED, a data result set corresponding to an alarm simulation task is retrieved in a storage component by a server number;
(Step 2) generating an alarm simulation task according to the alarm simulation template, which comprises:
(Step 21) generating a task type corresponding to a template type of the alarm simulation task request of the presentation component, and transmitting the task type to a task component;
(Step 22) continuously reading the data result set in the storage component and determining the alarm simulation task status; and
(Step 23) returning the alarm simulation task status to the presentation component;
(Step 3) executing the alarm simulation task and generating another data result set, wherein the step of (Step 3) comprises:
(Step 31) acquiring history data information of a first time period from the storage component according to the template type corresponding to the alarm simulation task;
(Step 32) dividing the history data information of the first time period into history data information of a plurality of second time periods according to time, wherein the second time period is a sub-period of the first time period;
(Step 33) performing parallel statistics on the historical data information of the plurality of second time periods, and obtaining a plurality of sub-statistical results;
(Step 34) aggregating the plurality of sub-statistical results into an aggregate statistical result according to time; and
(Step 35) comparing the aggregate statistical result with a threshold interval, and obtaining the another data result set which comprises an amount of alarms;
(Step 4) storing and providing the another data result set for the presentation component through the storage component, which comprises:
(Step 41) setting up three levels of tables according to different business requirements, which are respectively port table, site table and application table;
(Step 42) binding data, which are written to the storage component and have a percentage attribute, with the alarm simulation task status of the server, and obtaining the another data result set; and
(Step 43) responding the another data result set to the server in real time;
(Step 5) selecting a different alarm simulation time range, and obtaining multiple data result sets according to the steps (Step 1 to Step 4); and (Step 6) according to a flow situation of each network node, judging the alarm threshold by combining the data result sets with network quality requirements.

6. The method, as recited in claim 5, wherein: the step of (Step 35) comprises:
- (Step 351) collecting a plurality of data points from the aggregate statistical result according to time granularity parameter in the template parameters;
- (Step 352) performing curve fitting of the data points and obtaining a data curve; and
- (Step 353) counting a time T corresponding to each line segment with data curve exceeding the threshold range, and regarding a quantity of continuous line segments with corresponding time T that is greater than duration parameter in the template parameters as the amount of alarms.

7. The method, as recited in claim 6, wherein: in the step of (Step 11), presenting the alarm simulation task request to the server comprises:
- (A1) generating a data form according to the template types and the template parameters set by a user through a page;
- (A2) matching a data source port with the data form;
- (A3) if matching is successful, distributing the data form to a cache area of the server; if matching fails, returning failure information to the presentation component; and
- (A4) generating a plurality of workgroups according to a matching result, and retrieving the data form in the cache area, wherein when there are the plurality of workgroups, concurrently processing tasks through the plurality of workgroups.

8. The method, as recited in claim 7, wherein: in the step of (Step 12), asynchronously polling the alarm simulation task status of the server through the presentation component comprises:
- (B1) continuously generating a status query request task of the server by the presentation component according to a preset time interval;
- (B2) if multiple servers work at the same time, selecting a most appropriate server according to a load balancing algorithm; and
- (B3) distinguishing each status query request task of the server according to a workgroup number as a mark, distributing the workgroup number to a selected server, wherein the server maintains a same polling frequency as the presentation component, and returns the alarm simulation task status to the presentation component; wherein the alarm simulation task status comprises task accepted but not processed, task being processed and task completed.

9. The method, as recited in claim 8, wherein: in the step of (Step 21), generating the task type comprises:
- (C1) receiving a corresponding data form according to the task type of the alarm simulation task request generated by the presentation component;
- (C2) generating corresponding task information according to a content of the data form; and
- (C3) submitting the task information and generating a preprocessing task into a task queue, for the task component to schedule preprocessing tasks in the task queue.

10. The method, as recited in claim 9, wherein: in the step of (Step 22), the server continuously reading the data result set in the storage component comprises:
- (D1) matching a corresponding data result set in a database according to the workgroup number and querying a result; and
- (D2) storing an immediate data result set status in the cache area by the storage component, reading the cache area and presenting a result status by the server.

* * * * *